No. 769,942. PATENTED SEPT. 13, 1904.
G. EISOLD.
STOCK BROODING AND NURSING APPARATUS.
APPLICATION FILED MAY 2, 1904.
NO MODEL.

WITNESSES:
F. A. Otto
N. J. Taugher

INVENTOR
Gustav Eisold
BY Erwin F. Wheeler
ATTORNEYS

No. 769,942.

Patented September 13, 1904.

UNITED STATES PATENT OFFICE.

GUSTAV EISOLD, OF WILSON, WISCONSIN, ASSIGNOR OF ONE-HALF TO FRED C. RUNGE, OF SHEBOYGAN, WISCONSIN.

STOCK BROODING AND NURSING APPARATUS.

SPECIFICATION forming part of Letters Patent No. 769,942, dated September 13, 1904.

Application filed May 2, 1904. Serial No. 205,900. (No model.)

*To all whom it may concern:*

Be it known that I, GUSTAV EISOLD, a citizen of the United States, residing at the town of Wilson, county of Sheboygan, and State of Wisconsin, have invented new and useful Improvements in Stock Brooding and Nursing Apparatus, of which the following is a specification.

My invention relates to improvements in stock nursing and brooding apparatus designed more especially for infant pigs, but capable of use for other animals as well.

The objects of my invention are, first, to provide simple and inexpensive means for furnishing a supply of warm food in liquid form to the infant animals, of which food a constant supply may be maintained and heated by artificial means; second, to provide a form of construction which may be easily kept clean and which will not get out of repair; third, to provide a form of construction in which the heat used for warming the feed will be also utilized in providing a warm rest for the animals and uniformly distributed thereto and to the food-supply.

In the following description reference is had to the accompanying drawings, in which—

Figure 1:
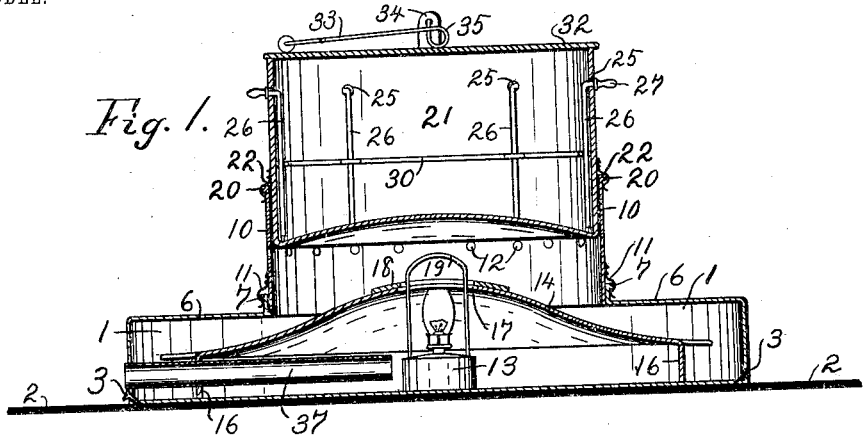
Figure 2:
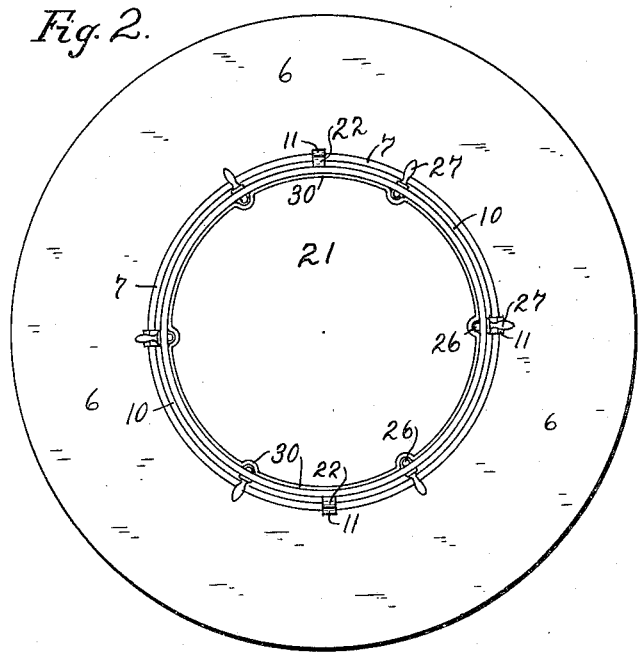
Figure 3:
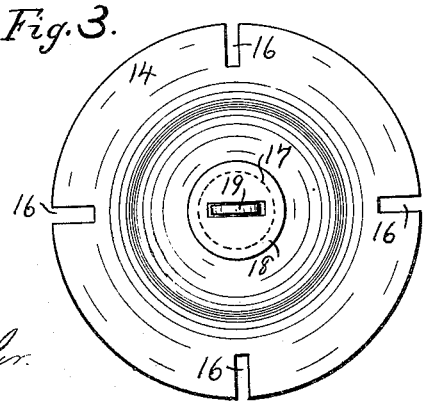
Figure 4:
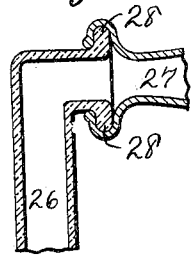

Figure 1 is a vertical sectional view of my invention. Fig. 2 is a plan view of the same. Fig. 3 is a detail plan view of the heat-deflecting hood which covers the lamp. Fig. 4 is an enlarged detail sectional view of the upper end of one of the suction-tubes 26 and a portion of a nipple attached thereto.

Like parts are identified by the same reference characters throughout the several views.

A sheet-metal inclosure 1, open at the top, is secured to a floor 2 or other support by means of screws 3 passed diagonally through holes near the base of the inclosure. The upper portion of the inclosure is reduced in size, the walls being offset inwardly on a horizontal plane forming a shelf 6, and the upper end of the reduced portion is provided with a rolled margin 7 of sufficient size to form a rest for the feet of the animals.

A ring 10 is adapted to fit within the upper portion of the inclosure and is provided with resilient clamping-arms 11, which engage over the margin 7 when the ring is in position of use, and thus hold the ring firmly in such position. The arms also serve as stops to prevent the ring from moving downwardly in the inclosure farther than is desired. This ring is provided with a series of apertures 12, which serve as a vent for the escape of warm air and gases of combustion passing upwardly from the lamp 13, which is placed upon the floor within the inclosure and covered by an arched deflecting-hood 14, adapted to direct the heated air and gas from the lamp outwardly and underneath the shelf 6. The edges of the hood are preferably notched, as indicated at 16, and bent downwardly to form feet, which support the hood in position. To permit the removal of the lamp, the hood is provided with an aperture 17, covered by a loose cap 18, through which a bail 19 projects from the lamp, whereby by lifting upon the bail the cap and lamp may be removed and replaced at pleasure. The upper edge of the ring 10 is rolled outwardly, as shown at 20. A liquid-containing receptacle 21 is adapted to fit within the ring 10 and is provided with resilient clamping-arms 22, similar to the clamping-arms 11 and which engage over the rolled margin 20 of the ring 10 and support the receptacle from the ring. The receptacle is thus supported from the ring 10 with its bottom above the aperture 12. These apertures are located near the central portion of ring 10.

Near its upper edge the receptacle is provided with a series of holes 25, through each of which holes a suction-tube 26 is inserted. Each of these suction-tubes is elbowed, with one arm extending downwardly within the receptacle, nearly to the bottom thereof, and another arm extending through the hole and provided with a nipple 27, which is held in position by an enlargement 28 at the outer extremity of the tube. These tubes are preferably made of glass and are held in position by the engagement of the nipples against the outer surfaces of the receptacle 21 and also by a ring 30, preferably of wire and arranged to bear against the downwardly-projecting arms of the tubes within the receptacle.

The receptacle is provided with a cover 32 and a bail 33. The bail is made of springwire, engaging ears 34 on the sides of the receptacle and having loops 35 near said ears and positioned for engagement with the cover when the bail is swung downwardly. The loops are so formed that when the bail is swung in one direction they will move into engagement with the cover and will be moved along the surface of the cover past the pivot-line of the bail—*i. e.*, past the line in which the bail engages the ears. With this construction when the bail is swung downwardly it will be locked in position by the loops bearing on the cover and the cover thereby held from displacement by the animals. The shelf 6 may be covered with straw or cloth and forms a warm resting-place for the animals. A tube 37 may be used to convey air to the lamp from the side of the inclosure, whereby the incoming air will not interfere with the outwardly-moving warm air-currents deflected by the shield into the outer portions of the inclosure.

Having thus described my invention, what I claim as new, and desire to secure by Letters Patent, is—

1. In apparatus of the described class, the combination of an inclosure; a liquid-containing receptacle removably fitted to the inclosure; a series of rigid tubes extending upwardly within the receptacle and outwardly through apertures in the upper portions of the receptacle-walls; a ring within the receptacle engaging said tubes; and exterior nipples secured to the projecting ends of the tubes and coöperating with the ring to hold the tubes in position.

2. In apparatus of the described class, the combination with an inclosure; a receptacle removably fitted to the inclosure and provided with a series of suction-tubes extending through the walls of the receptacle near its top and downwardly within the receptacle; nipples secured to said tubes exterior to the receptacle; a removable cover for the receptacle and a bail connected with the receptacle and having loops adapted to bear upon said cover and to move past the line of the bail-pivots when the bail is folded upon the cover.

3. In apparatus of the described class, the combination of an inclosure, provided with an inwardly-projecting shelf, a heater within the inclosure; a shield covering said heater and arranged to deflect the heat therefrom underneath said shelf; an upwardly-projecting ring adapted to receive the heated air from underneath the shelf and provided with apertures near its upper margin for the escape of such air and a receptacle adapted to fit within the ring; a series of suction-tubes leading from the lower portion of the receptacle upwardly and outwardly through the walls of the receptacle and nipples secured to said suction-tubes exterior to the receptacle.

4. In apparatus of the described class, the combination of an inclosure, provided with an inwardly-projecting shelf; a heater within the inclosure; a shield covering said heater and arranged to deflect the heat therefrom underneath said shelf; an upwardly-projecting ring adapted to receive the heated air from underneath the shelf and provided with apertures near its upper margin for the escape of such air; and a receptacle adapted to fit within the ring; a series of suction-tubes leading from the lower portion of the receptacle upwardly and outwardly through the walls of the receptacle and nipples secured to said suction-tubes exterior to the receptacle.

5. In apparatus of the described class, the combination of an inclosure formed with an inwardly-projecting shelf and having an upwardly-projecting annular extension; a ring fitting said annular extension and having resilient clamping-arms engaging the outer surface thereof; the upper margin of said extension being rolled outwardly for engagement with said clamping-arms and adapted to form a rest for the feet of small animals; a receptacle fitting said ring and having resilient clamping-arms engaging the outer surface thereof; a series of suction-tubes extending upwardly from near the bottom of the receptacle and outwardly through the walls thereof; and nipples secured to the projecting ends of the tubes; together with a heater, located within said inclosure; an arched deflecting-shield covering said heater; a bail connected with the heater and extending through an aperture in the shield; and a cap, covering said aperture and engaging said bail; said aperture being adapted to permit the removal of the heater therethrough and said deflecting-shield being adapted to direct the heated air under said shelf.

In testimony whereof I affix my signature in the presence of two witnesses.

GUSTAV EISOLD.

Witnesses:
LEVERETT C. WHEELER,
G. J. DAVELAAR.